United States Patent [19]
Sirel

[11] Patent Number: 4,463,406
[45] Date of Patent: Jul. 31, 1984

[54] APPARATUS FOR PROTECTING AN ELECTRIC LINE AGAINST DISTURBANCES WITH VERY STEEP WAVE FRONTS

[75] Inventor: Michel Sirel, Paris, France
[73] Assignee: Les Cables De Lyon, Clichy, France
[21] Appl. No.: 339,192
[22] Filed: Jan. 13, 1982

[30] Foreign Application Priority Data
Jan. 14, 1981 [FR] France ............................... 81 00538

[51] Int. Cl.$^3$ ............................................. H02H 3/20
[52] U.S. Cl. ...................................... 361/56; 361/91; 361/110; 361/111; 361/119
[58] Field of Search .................... 361/54–56, 361/91, 110–112, 117–119; 174/32, 34, 35 R, 35 A, 35 E, 35 G, 50, 56; 333/12, 181, 182, 185

[56] References Cited
U.S. PATENT DOCUMENTS
3,274,447  9/1966  Nelson.
3,795,840  3/1974  Cambra ........................ 361/118 X
3,875,466  4/1975  Jakszt.

OTHER PUBLICATIONS
"Hardening Techniques"—Godts et al., IEEE International Symposium on Electromagnetic Compatability, Aug. 2–4, 1977.

Primary Examiner—Harry E. Moose, Jr.
Attorney, Agent, or Firm—Sughrue, Mion, Zinn, Macpeak, and Seas

[57] ABSTRACT

An apparatus for protecting a low-tension electric line (31) against disturbances with very steep slopes, said apparatus having a box (9) with a plurality of compartments (10, 15, 22, 26) in series which is equipped with limiter units such as dischargers and is disposed upstream from the line which is to be protected.

It includes upstream from the box an electric conductor (3) of appreciable length surrounded by a metal tube (4) which is closed at its ends by insulating windows (5, 6) and separated from said metal tube by a solid or gaseous insulant (7).

Application to the protection of electric power lines against disturbances due to powerful nuclear explosions.

8 Claims, 3 Drawing Figures

APPARATUS FOR PROTECTING AN ELECTRIC LINE AGAINST DISTURBANCES WITH VERY STEEP WAVE FRONTS The present invention relates to apparatus for protecting a low-tension electric line against disturbances having very steep wave fronts, said apparatus comprising a box with a plurality of compartments connected in series. The compartments are equipped with limiter units and the box is disposed upstream from the line which is to be protected.

BACKGROUND OF THE INVENTION

The use of apparatus of this type has already been recommended, in particular for the protection of low-tension electric power, measurement or transmission lines against the electromagnetic effects of nuclear explosions. However, they can only protect electric lines against pulses whose voltage increases at a speed of not more than 1 kV/nanosecond. Now, it will be easily understood that powerful nuclear explosions can induce disturbances which cause the tension in a line to increase at a speed of about ten or more kilovolts per nanosecond. The limiter units or dischargers of such apparatus may fail to trigger when they are subjected to disturbances which cause an increase in tension in such a short time, or they may trigger at very high tension and therefore under circumstances where they no longer fulfill their protective function.

Preferred embodiments of the present invention produce apparatus which efficiently protects low-tension lines against disturbances of the kind which cause the tension in a line to increase by between one and several tens of kilovolts per nanosecond, corresponding to an energy of several hundreds of kilojoules and permanent power of a hundred or so Kw, at very close time intervals. Said apparatus has a high shunt impedance and leaves residual disturbances of only a few hundreds of volts.

SUMMARY OF THE INVENTION

The present invention provides, upstream from the box, an electric conductor of appreciable length surrounded by a metal tube which is closed at its ends by insulating windows and separated from said metal tube by a solid or gaseous insulant.

Further, it preferably has at least one of the following features:

at least some compartments of the box which contain dischargers have two concentric enclosures—a steel outer enclosure and an inner enclosure made of a metal which is a good non-magnetic conductor and inside which discharger means is disposed;

a strip or bar of metal which is a good non-magnetic conductor forms a ground for all the compartments of the box as a whole;

the box comprises at least three compartments, a first compartment having one or a plurality of dischargers which are symmetrically distributed, a second compartment having one or two dischargers in parallel and a third compartment with only one discharger or a variable resistor whose resistance decreases with the applied tension;

the second and third compartments each have chokes upstream from the discharger(s);

the dischargers of each compartment have a lower triggering tension than the dischargers of the upstream compartment;

it further includes a fourth compartment with a power thyristor controlled by a circuit connected to the input of the second compartment and arranged to apply a thyristor "off" signal to the thyristor when a steep wave front appears in said second compartment.

BRIEF DESCRIPTION OF THE DRAWINGS

Two apparatuses for protecting low-tension power lines against disturbances with very steep wave fronts of about 20 kV/nanosecond are described by way of example and with reference to the figures of the accompanying drawings.

MORE DETAILED DESCRIPTION

Figure 1:
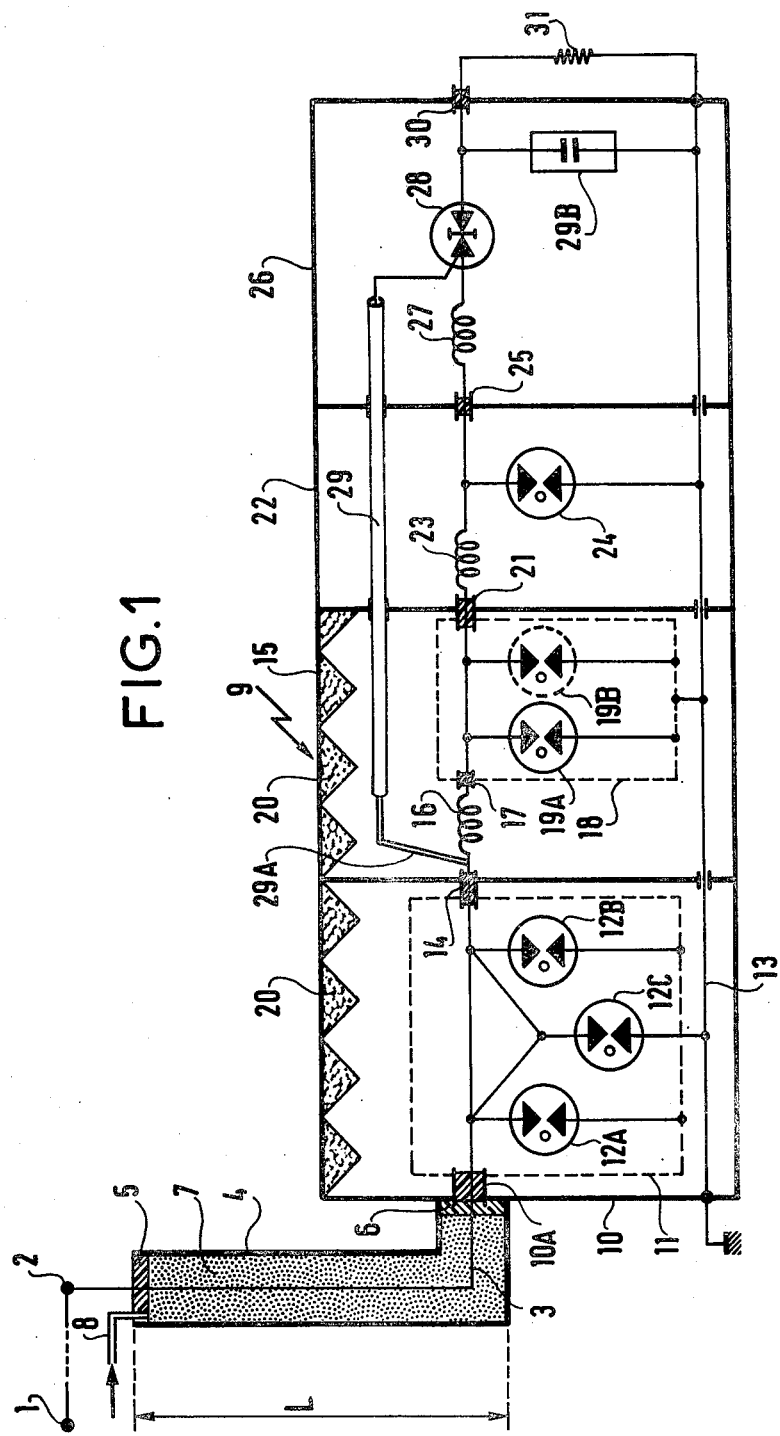
FIG. 1 is a partial sectional view end schematic diagram which illustrates a four-compartment apparatus for protecting one phase of a low-tension power line. The fourth compartment contains a thyristor to keep the circuit switched off while the disturbance is taking place.

In FIG. 1, the disturber pulse as well as the normal operation voltage reach an input terminal 2 of the apparatus for protecting the phase in question, which input terminal 2 is in a zone perturbed by a terminal 1.

It will be understood that the other phase have identical protection apparatus, not illustrated.

The disturber pulse whose slope may reach 20 kV/nanosecond and whose peak tension may reach 500 kV propagates along a phase conductor 3 surrounded by a metal tube 4 which is closed at both its ends by insulating sealing windows 5 and 6 made of alumina or glass.

The conductor 3 is insulated from the tube 4 by insulation 7 which may be gaseous or solid; a gaseous insulant (SF 6) is used when the incident disturbance reaches several hundreds of kV; a solid insulant (e,g. polyethylene or alumina) is used when the peak tensions are lower than 200 kV. Sulphur hexafluoride can be brought into the tube 4 via a pipe 8.

The conductor 3 and of the tube 4 constitute a coaxial line whose length L is such that the slope $P_o$ of the incident disturbance pulse drops to a value $P_1$ at the output of a conductor 3. The slope $P_1$ is also a function of the load impedance of the load circuit. Where the slope $P_o$ is 20 kV/ns, the slope $P_1$ drops to 3 to 5 kV/ns for a length L of 2 m (meters).

The disturbance pulse whose slope is $P_1$ and which comes from the conductor 3 enters a first compartment 10 of a metal box 9 via an insulating bushing 10A. Dischargers 12A, 12B and 12C are disposed symmetrically in parallel between the phase conductor and ground which is constituted by a copper floor grating 13; the dischargers are contained in a copper box 11 which is itself disposed in the steel compartment 10 so as to screen the dischargers both electrically and magnetically.

The number of dischargers installed is a function of the energy of the incident pulse and there could be fewer of them if the energy was lower.

When several dischargers are in parallel and are subjected to a voltage with a steep slope, one of the dischargers is triggered a short time before the others. The discharge tension of said discharger triggers in its turn a second discharger and so on.

The phase conductor then passes through an insulating bushing 14 into a second screened compartment 15. The slope of the disturber pulse is reduced to about 1 kV/10 ns on entering said compartment and the peak tension is reduced to about 10 to 20 kV. In said second compartment, there is a choke 16 which may have a value of 30 to 50 microhenrys, then, after an insulating bushing 17, there is a screened box 18 like the box 11 which contains two dischargers 19A and 19B which are symmetrically in parallel to each other between the phase conductor and earth.

The compartments 10 and 15 are lined with high-frequency absorbers 20 to damp the cavities constituted by said compartments. The absorbers 20 are made for example of a plastics substance charged with carbon black.

Then a third screened compartment 22 is reached via in insulating bushing 21 at whose input the slope of the pulse is reduced to about 1 kV/100 ns and the peak tension is reduced to 3 to 5 kV. In said compartment, there is a choke 23 which may have a value of 10 to 20 microhenrys then a parallel-connected discharger 24.

Dischargers 12A, 12B, 12C, 19A, 19B and 24 are of the type which are triggered by very steep wave fronts. Dischargers 19A and 19B are triggered preferably at a lower tension than 12A, 12B and 12C and likewise, discharger 24 is triggered preferably at a lower tension than dischargers 19A and 19B.

An insulating bushing 25 then allows access to a fourth screened compartment 26 at whose input the slope of the pulse is reduced to about 1 kV/microsecond and the peak tension is reduced to about 1 kV. In said compartment, there is a choke 27 whose value is less than 10 microhenrys and a power thyristor 28 which is controlled by a circuit 29 connected to the input of the compartment 15 by a coaxial cable 29A. The thyristor 26 is normally conductive and it breaks the circuit during the disturbance under the effect of the signal transmitted by the coaxial cable. A capacitor 29B prevents a sudden voltage drop.

Lastly, a through bushing 30 constitutes the output terminal of the protection apparatus at which bushing the slope of the disturbance is reduced to about 1 kV/10 microseconds and the peak tension is reduced to 100-200 v.

The useful load is here represented by a resistor 31 disposed between the output terminal and earth. It may be contained in a screened structure.

The impedance between the phase conductor and the neutral wire may be greater than 0.1 megohm.

Figure 2:
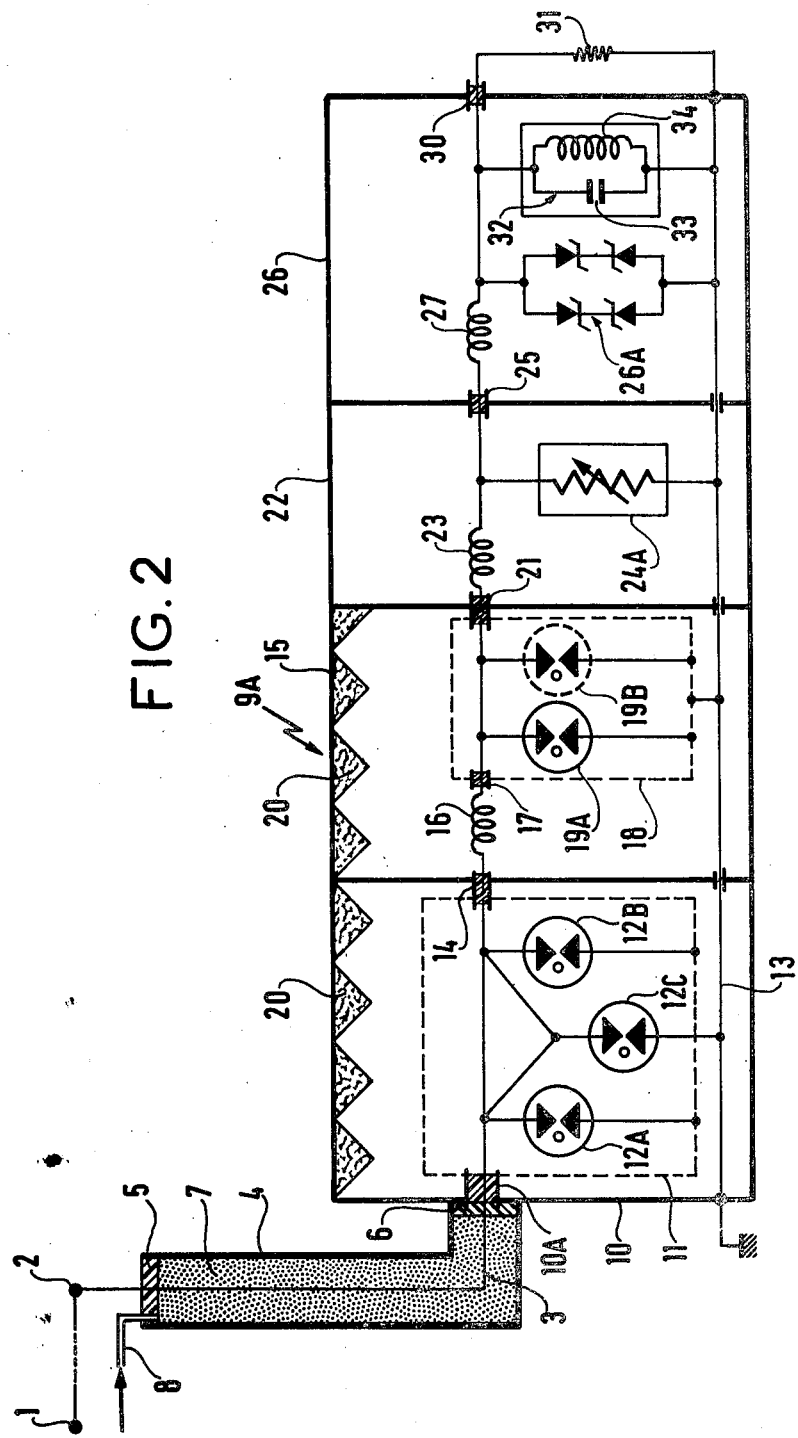
FIG. 2 is a similar view of that of FIG. 1 which illustrates an apparatus analogous to that in FIG. 1 except that the fourth compartment has no means to keep the circuit switched off during the disturbance.

The protection apparatus in FIG. 2 is identical to that in FIG. 1 as far as concerns the input coaxial line and the first two discharger compartments and these parts are not described again.

In compartment 22, the discharger is replaced by a variable resistor 24A which is sensitive to the tension and whose resistance decreases when the applied tension increases. Said resistor performs the same function as the discharger 24 but can withstand a higher current.

In the compartment 28, since the circuit is required not to be broken when the disturbance occurs, the thyristor 28 is replaced by Zener or trans-Zorb diodes 26A in parallel which are themselves in parallel with a filter 32 comprising a capacitor 33 and a choke 34.

Figure 3:
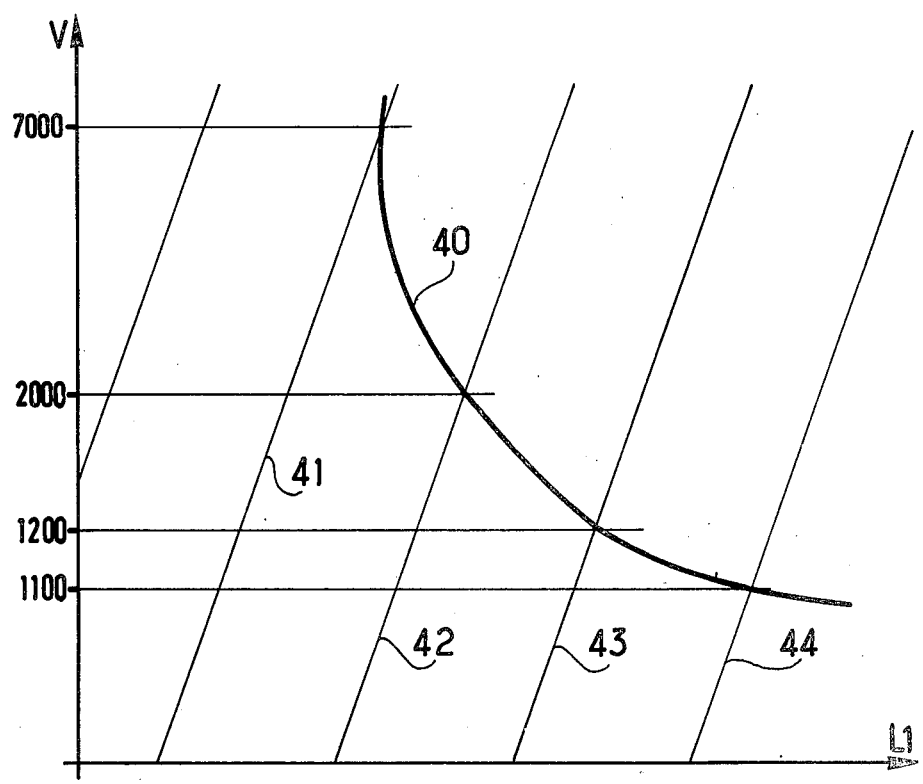
FIG. 3 is a plot which illustrates the variation in the discharger triggering tension as a function of the discharger positions in the compartments of the apparatus.

FIG. 3 shows a curve 40 which gives the triggering tensions V for the successive compartments as a function of their positions L1 in the apparatus of FIGS. 1 and 2, the straight lines 41, 42, 43, 44 corresponding to determined slopes of the incident disturbance. For example, triggering tensions of 7 kV, 2 kV, 1200 V and 1100 V are obtained for slopes of 1 kV/ns, 1 kV/10 ns, 1 kv/100 ns and 1 kv/microsecond respectively. Therefore, as a function of the slope of the incident disturbance and of its attenuation in the successive compartments, it is possible to determine at what voltage the dischargers will be triggered.

Although the protection apparatuses which have just been described with reference to FIGS. 1 and 2 of the drawing appear to be the preferable embodiments of the invention, it will be understood that various modifications can be made thereto without going beyond the scope of the invention, it being possible to replace some of their components by others which could perform an analogous technical function. In particular, the number of dischargers per compartment can be modified. The boxes can be earthed by a copper bar which extends through them.

I claim:

1. An apparatus for protecting a low-tension electric line against disturbances with very steep wave fronts, said apparatus comprising a box with a plurality of compartments connected in series, a long electric conductor extending through said compartments and being insulated therefrom, said compartments being equipped with limiter units connected to said conductor and said box being disposed upstream from the line which is to be protected, the improvement wherein said apparatus further includes, upstream from the box, said long electric conductor surrounded by a metal tube which is closed at its ends by insulating windows and separated from said metal tube by a solid or gaseous insulant.

2. An apparatus according to claim 1, wherein some of said limiters comprise dischargers and wherein at least some compartments of said box comprise two concentric enclosures, a steel outer enclosure and an inner enclosure made of a metal which is a good non-magnetic conductor, and at least one said discharger being disposed within said inner enclosure.

3. An apparatus according to claim 1, wherein a strip or bar of metal constituting a good non-magnetic conductor extends between said compartments and forms a ground for all of the compartments of the box as a whole.

4. An apparatus according to claim 1, wherein said box comprises at least three compartments, including: a first compartment having at least one discharger symmetrically distributed therein, a second compartment having a plurality of dischargers in parallel, and a third compartment having a single discharger or a variable resistor whose resistance decreases when the applied tension increases.

5. An apparatus according to claim 4, wherein said second and third compartments each have chokes upstream from the dischargers and connected in series with the electric conductor.

6. An apparatus according to claim 4, wherein the dischargers of each compartment have a lower triggering tension than the dischargers of the upstream compartment.

7. An apparatus according to claim 4, further including a fourth compartment with a power thyristor controlled by a circuit connected to the input of the second compartment and arranged to apply a thyristor "off" signal to the thyristor when a steep wave front appears in said second compartment.

8. An apparatus according to claim 4, further including a fourth compartment having power diodes and a band pass, both connected in parallel with said electric conductor.

* * * * *